United States Patent [19]

McGill

[11] Patent Number: 5,119,841
[45] Date of Patent: Jun. 9, 1992

[54] SAFETY SHUT OFF APPARATUS

[76] Inventor: James C. McGill, 4444 W. Cap Rd., Whites Creek, Tenn. 37189

[21] Appl. No.: 660,037

[22] Filed: Feb. 26, 1991

[51] Int. Cl.$^5$ .............................................. F16K 17/36
[52] U.S. Cl. ........................................... 137/38; 74/2; 200/61.45 R; 251/66
[58] Field of Search .................... 74/2; 137/38, 39, 45; 200/61.45 R, 61.52; 251/66

[56] References Cited

U.S. PATENT DOCUMENTS

| | | | |
|---|---|---|---|
| 3,552,482 | 1/1971 | Ando . | |
| 3,571,561 | 3/1971 | Ando . | |
| 3,878,858 | 4/1975 | Yamada | 137/38 |
| 3,994,359 | 11/1976 | Smitley | 137/38 X |
| 4,103,697 | 8/1978 | Kiesow | 137/45 |
| 4,429,704 | 2/1984 | Jones | 137/45 |
| 4,475,565 | 10/1984 | Keller et al. | 137/39 |
| 4,546,660 | 10/1985 | Bujold | 137/45 X |
| 4,742,839 | 5/1988 | Stock | 137/38 |
| 4,903,720 | 2/1990 | McGill | 137/38 |
| 4,971,094 | 11/1990 | Gonzalez | 137/38 |

FOREIGN PATENT DOCUMENTS 5132 2/1914 European Pat. Off. .............. 137/45

Primary Examiner—Robert G. Nilson
Attorney, Agent, or Firm—Wenderoth, Lind & Ponack

[57] ABSTRACT

A shock or vibration activated safety shut off apparatus includes a housing, an ON/OFF member drive mechanism, a first member movable rectilinearly from a first position to a second position, a second member movable rectilinearly from a third position to a fourth position, and an inertia responsive mechanism for forcing the first member into its second position in response to vibration or shock imparted to the housing. The inertia responsive mechanism includes an inertia cup having an indented upper surface, and an inertia ball normally resting on the indented surface, a lever pivotably mounted to the inertia cup and a permanent magnet mounted beneath the free end of the lever, such that when a shock or vibration causes the inertia ball to jump onto the lever and roll toward its free end, the inertia ball will be attracted to the permanent magnet and will cause the lever to be pivoted downwardly. As the lever overlies the first member, such pivoting of the lever will cause the first member to be force into its second position thereby actuating the safety device. One embodiment of the invention is specifically adapted for use with a rotary valve or the like, and includes a torsionally biased driving member which is operably couplable to the rotary valve member and is released from a lock position upon actuation of the safety shut off device. In a second embodiment, the safety shut off device is operable for use with an electrical switch or the like which can be turned off by a linearly movable member.

24 Claims, 3 Drawing Sheets

SAFETY SHUT OFF APPARATUS

BACKGROUND OF THE INVENTION

1. Field of the Invention

The present invention relates to a safety apparatus for automatically moving an ON/OFF member of a device upon the occurrence of a vibration or shock, such as a seismic disturbance or earthquake. More particularly, the present invention relates to a device operable to automatically close electrical switches or gas valves during seismic disturbances.

2. Description of the Prior Art

Various devices are known in the art for shutting off fuel systems and electrical devices in the event of a seismic disturbance or the like. For example, U.S. Pat. No. 3,994,359 to Smitley discloses a safety shut off fuel system which includes a housing having a first slidable member biased upwardly, but retained in a downward position so long as an inertia ball rests on top of the first member. When the housing is caused to tip, the inertia ball will move away from the first member and allow the first member to move upwardly. This, in turn, frees a second member to be moved by way of a biasing spring into engagement in a fuel passage to cut off the fuel supply. U.S. Pat. No. 4,103,697 to Kiesow discloses a safety sensor device which is operable to automatically shut off the flow of fluids through a passage. The Kiesow device includes a housing having a first member and a second member slidably mounted therein, the first member being biased upwardly, but retained in a downward position by an element connected to a pendulum. When the pendulum is caused to move a predetermined distance due to an earthquake or the like, the first member is moved upwardly, thus allowing a second member to be moved by a spring such that it moves a gate valve into the fluid passage, thereby cutting off flow of the fluid. U.S. Pat. No. 4,475,565 to Keller et al. discloses a magnetically actuable shock responsive unit which includes a housing having a pedestal mounted therein for receiving an inertia ball thereon. Upon occurrence of an earthquake or the like, the inertia ball is caused to move off of the pedestal and press down against a tubular element which, in turn, causes pivoting of a trigger element. Pivoting of the trigger element releases a pivotably mounted valve which is spring biased to a closing position. U.S. Pat. No. 4,546,660 to Bujold discloses an earthquake responsive valve motor which includes a spring biased rotary member adapted to be connected to a gas valve or the like, and a pivotable lever pivotable between a position in which it latches the rotary member against movement toward its spring biased direction, and a releasing position. A pendulum is provided which, upon occurrence of an earthquake or the like, presses upwardly against a portion of the pivotable lever causing the pivotable lever to move to its releasing position. U.S. Pat. No. 4,742,839 to Stock and U.S. Pat. No. 4,429,704 to Jones disclose a vibration activated valve operating mechanism which includes a member attached to a gas valve and spring biased toward a closing position of the gas valve, a member latching the spring biasing member against movement, and a mass member which is operably connected to the latch member, and upon occurrence of an earthquake or the like, causes release of the latch member. U.S. Pat. No. 3,878,858 to Yamada discloses a safety device including a plunger member spring biased toward an extended position, but retained in a retracted position by way of a latch portion of a pivoted lever member. An inertia ball is normally set atop a pedestal but, upon occurrence of an earthquake or the like, is caused to drop off the pedestal and onto one end of the lever member. When this occurs, the lever member is pivoted to a position in which its latch portion no longer latches the plunger. British published specification no. 5132 discloses a device for use in cutting off fuel or energy supplies of various type of vehicles. The device includes a valve member biased toward a closed position but maintained in an open condition by a first member. The first member is biased toward a position on which it allows the valve member to move toward its closed position, but is normally maintained by a pendulum in a position which blocks the closing movement of the valve member. When the pendulum is caused to swing to one side or the other, it allows the first member to move upwardly, thereby allowing the valve member to move to a closed position.

SUMMARY OF THE INVENTION

The present invention is embodied as a safety apparatus which is an improvement of a safety apparatus disclosed in Applicant's own U.S. Pat. No. 4,903,720 issued on Feb. 27, 1990.

The present invention comprises a safety apparatus for automatically moving an ON/OFF member of a device (e.g. a valve stem of a valve) upon occurrence of vibration or shock. The apparatus includes a trigger housing, a first member mounted in the trigger housing for rectilinear movement between a first position and a second position, a second member mounted at least partially in the trigger housing for rectilinear movement between a third position and a fourth position, such that the second member is in the third position when the first member is in the first position and the second member is movable to the fourth position when the first member is moved to the second position, and a second member moving means for moving the second member from the third position to the fourth position when the first member is moved from the first position to the second position. An ON/OFF member moving means is operatively connected to the second member for moving the ON/OFF member of the device when the second member is moved from the third position to the fourth position. The first member is biased toward the first position by a biasing means and is automatically moved by a first member moving means from the first position to the second position against the bias of the biasing means upon the occurrence of a vibration or shock of greater than a predetermine magnitude.

The first member moving means comprises a lever pivotably mounted about an axis for movement between a fifth position in which the lever does not significantly press against the first member and a sixth position in which the lever presses the first member into a second position, an inertia cup mounted in the trigger housing and having an indented upper surface, and an inertia ball disposed in the trigger housing and being adapted to rest on the indented upper surface of the inertia cup. The lever is mounted with one end thereof adjacent the inertia cup such that, upon occurrence of a vibration or shock of greater than a predetermined magnitude, the inertia ball is moved from the upper surface of the inertia cup and onto the lever. The lever is preferably trough shaped, and once the inertia ball is moved onto the lever, the inertia ball will roll along the lever toward the other end of the lever. A permanent magnet is placed beneath the other end of the lever and the inertia ball is formed of a magnetically attractable material, such that when the inertia ball reaches the other end of the lever (i.e. above the permanent magnet) the inertia ball is attracted toward the magnet, thus forcing the lever to pivot about its pivot axis. When such pivoting occurs, the lever presses downwardly against the first member so as to move the first member into its second position. When this occurs, the second member moving means forces the second member to move into its fourth position, thereby allowing the ON/OFF member moving means to move the ON/OFF member of the device.

In one embodiment of the invention, the ON/OFF member moving means comprises a drive housing, a drive member rotatably mounted in the drive housing, and a torsion spring operatively coupled to the drive member for biasing it toward a particular direction. The ON/OFF member moving means further comprises a locking housing rotatably mounted to both the trigger housing and the drive housing, a locking member mounted at least partially in the locking housing for rectilinear movement between a locking position and a release position, an engaging recess formed in a surface of the drive member, and an engaging ball disposed between the locking member and the surface of the drive member such that the locking ball can enter the engaging recess when the engaging recess is aligned with the locking member.

In another embodiment of the invention, the ON/OFF member moving means comprises a drive member mounted in a drive bore formed in the trigger housing for rectilinear movement between a retracted position and an extended position, and a spring for biasing the drive member toward the extended position, in which the drive member extends outwardly of the trigger housing.

BRIEF DESCRIPTION OF THE DRAWINGS

Preferred embodiments of the present invention will now be described with reference to the drawing figures, in which.

DETAILED DESCRIPTION OF THE INVENTION

Figure 1:
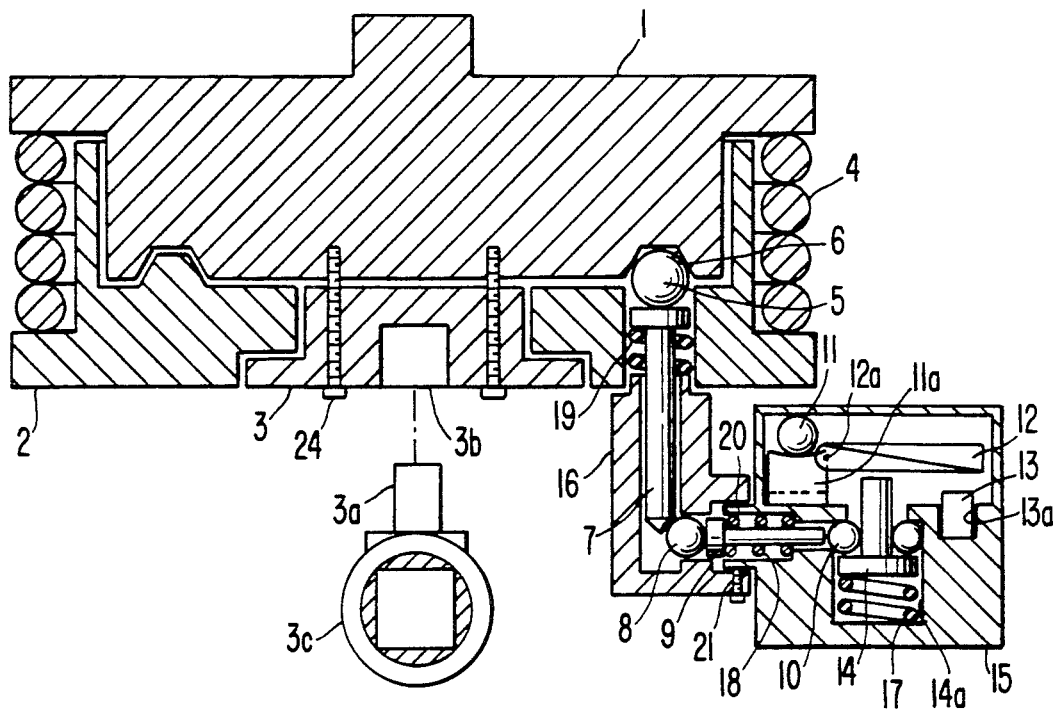
FIG. 1 is a cross sectional front view of a safety shut off apparatus in a "set" condition, in accordance with a first preferred embodiment of the present invention.

A first preferred embodiment of the present invention will now be described with reference to FIGS. 1-3. Although this first embodiment can be used for turning any rotary member, it will be described hereinafter in connection with a rotary valve member 3c having a valve stem 3a.

In the safety apparatus of the invention, a drive housing 2 is provided and is adapted to be fixed with respect to the valve member 3c by any suitable fastening means (not shown), such as a U-clamp or clamps. A socket member 3 is rotatably mounted in the drive housing and includes a valve socket 3b into which the valve stem 3a is inserted for positive coupling with the socket member 3. A drive member I is also rotatably mounted in the drive housing 2 and is fixed for rotation with the socket member 3. Although the drive member 1 can be fixed to the socket member 3 by any suitable means, it is contemplated that the socket member 3 will be connected to the drive member 1 by fasteners 24 such as bolts or the like. A torsion spring 4 is mounted about the drive housing 2 and is operatively coupled between the drive member 1 and the drive housing 2, such that, when the safety apparatus is in a "set" condition, the drive member 1 is biased for rotation in a rotary direction for causing the socket 3 to rotate the valve stem 3a of the valve 3c in a closing direction, such closing direction normally being clockwise when viewed from above in FIG. 1. The drive member 1, drive housing 2, socket 3 and torsion spring 4 are collectively referred to as an ON/OFF member moving means.

A rotation limiting groove 25 (see FIG. 2) is preferably formed in a bottom surface of the drive member 1 in a circumferential arc of 90 degrees. A rotation limiting projection 25a is formed on the drive housing 2 and fits in the rotation limiting groove 25, such that rotation of the drive member 1 with respect to the drive housing 2 is limited to 90 degrees as defined by the 90 degree arc of the rotation limiting groove 25. If the invention is being used with a rotary valve which can be continually rotated through closed and opened positions, this features ensures that the rotary valve will only be rotated by rotation of the drive member 1 from an opened position to a closed position. If, however, the safety apparatus is to be used with a rotary valve or the like which requires greater than 90 degree rotation to move from its open to its closed position, the rotation limiting groove 25 formed in the drive member 1 can be made to cover a suitably longer arc. Likewise, if the rotational requirements of the rotary valve or the like are less than 90 degrees, the rotation limiting groove 25 can be formed along less than a 90 degree arc.

The ON/OFF member moving means is normally maintained in a "set" condition by a locking means which includes an engaging recess 6 formed in a bottom surface of the drive member 1, an engaging ball 5, a bore 5a formed in the drive housing 2, a locking housing 16 mounted to the drive housing 2 and including a bore (or locking pin recess) 7a formed therein, a locking pin slidably mounted in the bore 5a in the driver housing and the bore 7a in the locking housing 16, and a locking spring 19 biasing the locking pin toward the drive member 1.

Figure 2:
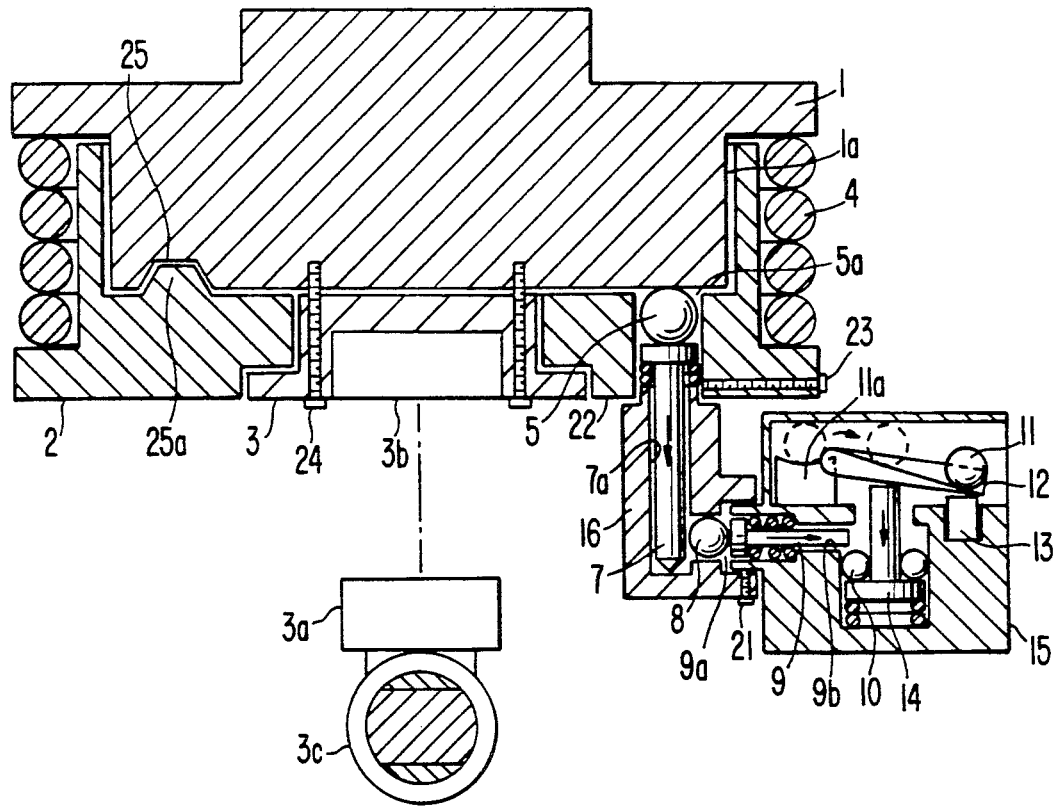
FIG. 2 is similar to FIG. 1, except it shows the apparatus in an "actuated" condition.

A trigger housing 15 is mounted to the locking housing 16, and has a release pin bore 14a formed therein in which a release pin (or first member) 14 is slidably mounted for rectilinear movement between a first position (as shown in FIG. 1) and a second position (as shown in FIG. 2). A trigger pin (or second member) 9 is slidably disposed in a pair of aligned trigger pin bores 9a, 9b formed in the locking housing 16 and trigger housing 15, respectively. The trigger pin 9 is rectilinearly movable between a third position (as shown in FIG. 1) and a fourth position (as shown in FIG. 2), and is biased toward its third position by a trigger spring (or second member biasing means) 18.

In a "set" condition (see FIG. 1) of the safety apparatus, a locking ball (or second member moving means) 8 is disposed partially in the trigger pin bore 9a and partially in the locking pin bore 7a. The locking ball 8 is pressed into this position by the force of the trigger spring 18 acting against the trigger pin 9, such that the locking ball maintains the locking pin 7 in a raised position in which it presses the engaging ball 5 into the engaging recess 6 of the drive member 1, thereby locking the drive member 1 against rotation. The torsional bias of the torsion spring 4 continuously exerts a downward pressure, through the walls of the engaging recess, against the engaging ball 5. This, in turn, creates a downward pressure against the locking pin 7, which presses the locking ball 8 against the trigger pin 9. However, when the safety apparatus is in its "set" condition, the trigger pin 9 is blocked from moving toward its fourth position by a plurality of trigger balls 10 which, in the preferred embodiment, comprises three trigger balls 10 spaced about the release pin 14.

In the "set" condition, the release pin 14 is biased upwardly by a release spring (or first member biasing means) 17 which maintains the trigger balls 10 in their upper position blocking the trigger pin 9 from moving to its fourth position.

Upon occurrence of a shock or vibration, such as an earthquake or the like, which is greater than a predetermined magnitude, the release pin 14 is forced downwardly against the bias of release spring 17 by a first member moving means. The first member moving means is mounted in the trigger housing 15 trigger housing 15, an inertia cup 11a, and a lever 12 pivotably mounted about an axis 12a to the trigger housing 15, and preferably to the inertia cup 11a. The lever 12 is mounted for pivotal movement between a fifth position (as shown in FIG. 1) in which it is spaced upwardly from or does not significantly press against the release pin 14, and a sixth position (as shown in FIG. 2) in which it presses downwardly against the release pin 14 against the bias of spring 17. Upon occurrence of a vibration or shock, the lever 12 is forced to move from its fifth position to its sixth position by a lever moving means which comprises the inertia cup 11a, inertia ball 11, and the magnet 13 disposed in the magnet recess 13a. The magnet 13 is contemplated as being a permanent magnet and more particularly as being a rare earth permanent magnet, especially a permanent magnet formed of neodymium. The inertia ball 11 which is formed of a magnetically attractable material such as steel or the like is, in the "set" condition, mounted atop the inertia cup 11a and maintained thereon by an indentation formed in the upper surface of the inertia cup 11a. However, upon occurrence of a shock or vibration, the inertia ball 11 is caused to move onto the lever 12, along which it rolls until it reaches the end thereof opposite to the end which is pivoted to the inertia cup 11a. As the magnet 13 is positioned beneath the free end of the lever 12, when the inertia ball 11 reaches the free end of the lever 12, it is attracted to the magnet 13, thereby forcing the lever 12 to pivot downwardly toward the magnet 13 and press downwardly against the release pin 14.

As stated previously, the inertia ball 11 is seated in an indentation formed in the upper surface of the inertia cup 11a. This indentation is preferably defined as a conically shaped recess having walls sloping upwardly and radially outwardly from a center thereof. The slope of the walls of the recess is preferably about 15 degrees from the horizontal but can be varied so as to provide varying degrees of sensitivity for the safety apparatus of the invention. This is, as the slope of the indentation walls increases, the inertia ball 11 become less likely to "jump" off of its seat, thereby decreasing the sensitivity of the apparatus.

Thus, from the "set" condition shown in FIG. 1, upon the occurrence of a shock or vibration greater than a predetermined magnitude, the inertial ball 11 will "jump" from its seat on the inertia cup 11a and onto the lever 12 along which the inertia ball 11 will roll to a free end of the lever 12. When the ball 11 reaches the free end of the lever 12, it will then be attracted downwardly by the magnet 13, thereby pivoting the lever 12 about its axis 12a, and pressing the release pin 14 downwardly against the bias of release spring 17. When this occurs, the trigger balls 10 will ride downwardly with release pin 14 and allow the trigger pin 9 to be pressed by locking ball 8 (which is pressed against by locking pin 7 and engaging ball 5) from its third position (FIG. 1) to its fourth position (FIG. 2). As the locking pin 7 and engaging ball 6 move downwardly, the drive member 1 is freed to be rotated relative to the drive housing 2 by the torsion spring 4. Rotary motion of the drive member 1 causes rotation of the socket 3, and thus, causes rotation of the valve stem 3a from its open position to its closed position.

An additional feature of this first embodiment is that the safety apparatus thereof can be mounted in virtually any orientation in order to be properly coupled to the valve stem 3a of the valve 3c. This is accomplished by having the locking housing 16 rotatably mounted to the drive housing 2, and the trigger housing 15 rotatably mounted to the locking housing 16. Although the rotatable mounting of the housings 15 and 16 to the housings 16 and 2, respectively, can be by any suitable means, it is contemplated that the housing 16 be provided with an annular flange 22 which extends into the bore 5a in the drive housing 2. A set screw 23 can then be inserted into the threaded hole in the drive housing 2 so as to lock the locking housing 16 in a rotary position with respect to the drive housing 2. Likewise, the trigger housing 15 can be provided with an annular flange 20 extending into the trigger pin bore 9a in the locking housing 16, and a set screw 21 can be provided through a threaded hole in the locking housing 16 to lock the rotary position of the trigger housing 15 relative to the locking housing 16.

Figure 3:
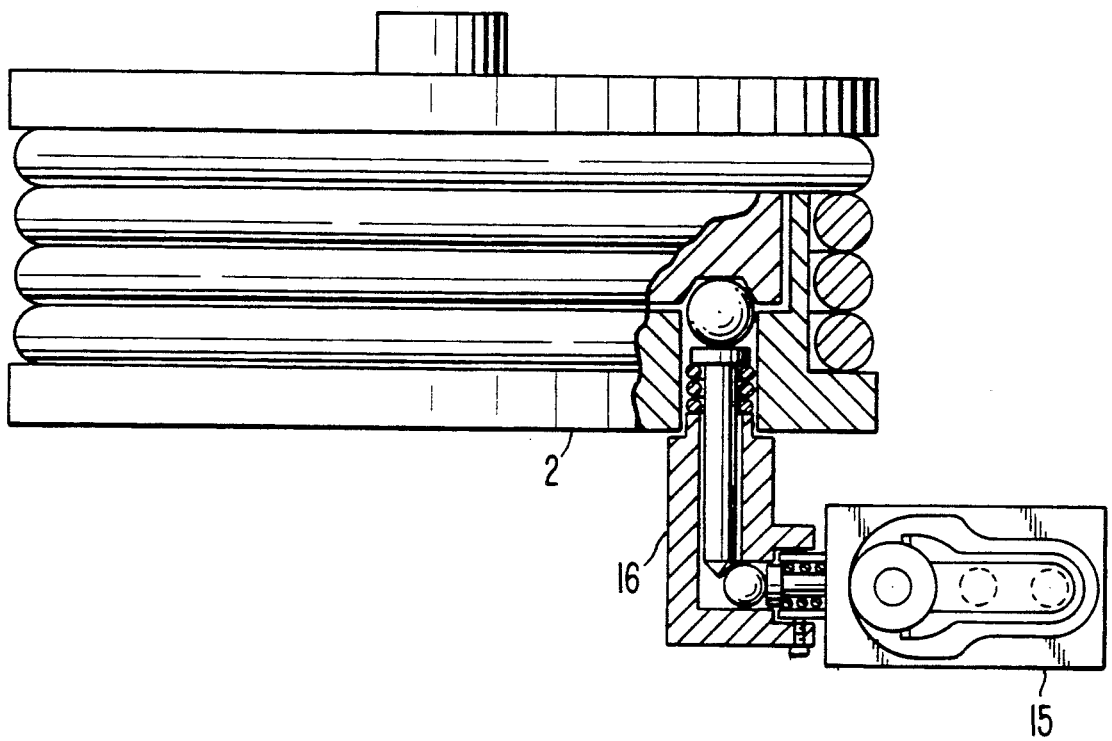
FIG. 3 shows a front partially cut-away view of the first embodiment of the invention, with a trigger housing of the apparatus rotated ninety degrees relative to its position shown in FIGS. 1 and 2.

In this regard, FIG. 3 shows the trigger housing 15 rotated with respect to the locking housing 16 by 90 degrees relative to the position thereof shown in FIGS. 1 and 2.

A second embodiment of the safety apparatus of the present invention will now be described with reference to FIGS. 4-6. This embodiment can be utilized to turn off any device which has an ON/OFF member which can be turned off by a linear force, such as an electrical switch 120 (see FIG. 5).

Figure 4:
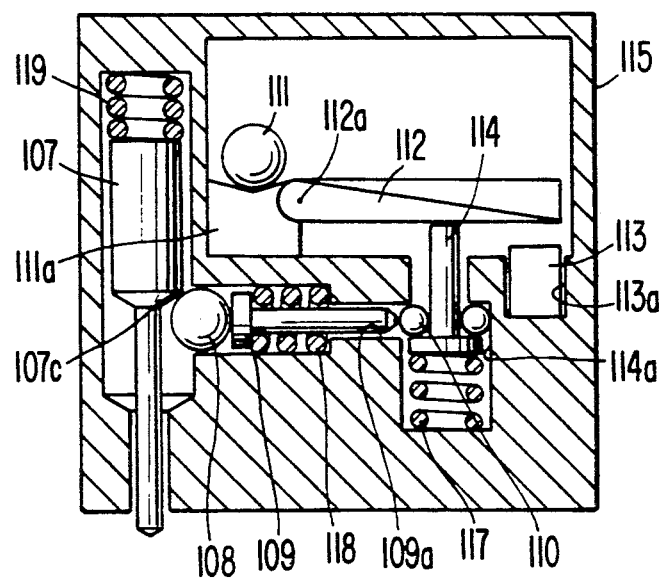
FIG. 4 shows a front cross sectional view of a safety shut off apparatus in a "set" condition in accordance with a second embodiment of the present invention.
Figure 5:
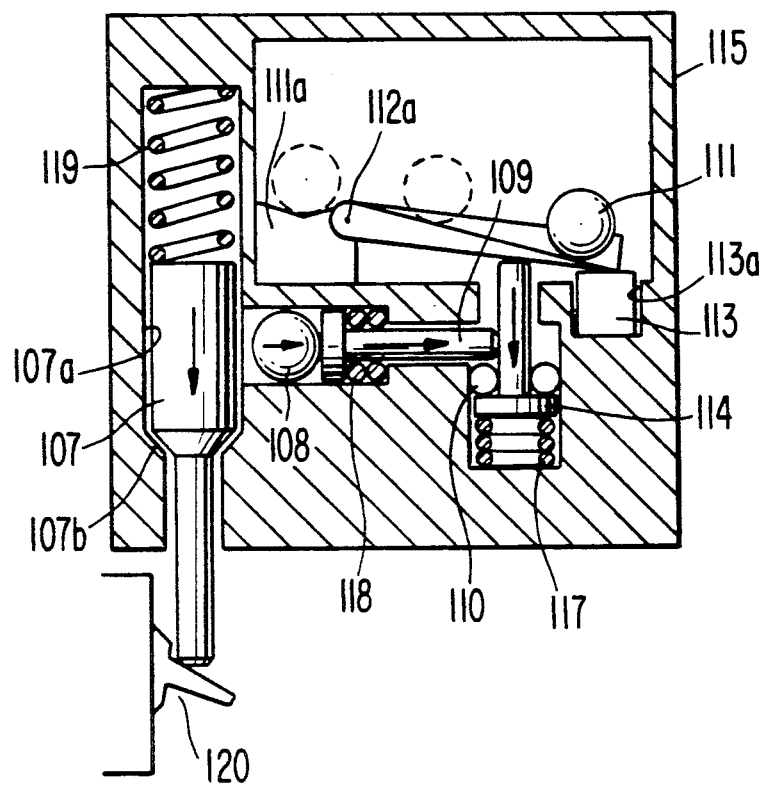
FIG. 5 shows a view similar to that in FIG. 4, but with the apparatus in an "actuated" condition.
Figure 6:
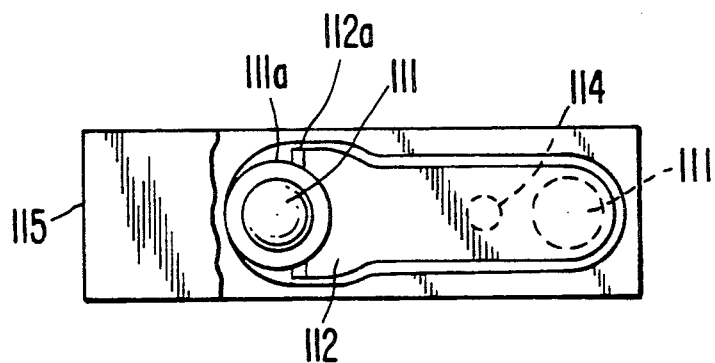
FIG. 6 shows a partially cut-away top view of the apparatus shown in FIG. 5.

This second embodiment is similar to the first embodiment in that it includes a trigger housing 115, a release pin bore 114a formed in the trigger housing, a release pin (or first member) 114 slidably disposed in the release pin bore for rectilinear movement between a first position (as shown in FIG. 4) and a second position (as shown in FIG. 5), and a release spring (or first member biasing means) 117 biasing the release pin 114 into its first position. Additionally, a trigger pin bore 109a is formed in the trigger housing 115 and has a trigger pin (or second member) 109 slidably mounted in the trigger pin bore 109a for rectilinear movement between a third position (shown in FIG. 4) and a fourth position (shown in FIG. 5), and a trigger spring 118 biasing the trigger pin 109 toward its third position. A plurality (preferably three) of trigger balls 10 are spaced about the release pin 114 such that when the release pin 114 is in its first position, the trigger pin is blocked from moving into its fourth position by the trigger balls 110. As in the first embodiment, a first member moving means is also provided in the trigger housing. The first member moving means comprises an inertia cup 111a having an indented upper surface mounted in the trigger housing, a lever 112 pivotably mounted to the inertia cup 111a, and an inertia ball 111 disposed in the trigger housing 115 and operable to be displaced from its normal rest position on the inertia cup 111a upon the occurrence of a vibration or shock of greater than a predetermined magnitude, such that the inertia ball 111 moves onto the lever 112 and rolls toward its free end. When the inertia ball 111 is positioned at the free end of the lever 112, the inertia ball 111 is magnetically attracted to a permanent magnet 113 disposed in the magnet recess 113a, such that the lever 112 is forced to pivot downwardly and press the release pin 114 downwardly into its second position against the bias of release spring 117.

The safety apparatus according to the second embodiment of the invention also includes an ON/OFF member moving means. Unlike the ON/OFF member moving means of the first embodiment, the ON/OFF member moving means of the second embodiment is a linear type ON/OFF member moving means and comprises a drive pin 107 mounted in a drive pin bore 107a formed in the trigger housing 115 for rectilinear movement between an extended position and a retracted position, and a drive spring 119 also disposed in the bore 109a for biasing the drive pin downwardly toward its extended position. The drive pin 107 includes a tapered portion 107c connected to a large diameter portion and a small diameter portion, and the drive pin bore 107a includes a tapered portion 107b which is complementary to the tapered portion 107c of the drive pin 107 and which connects a large diameter portion of the drive pin bore 107a with a small diameter portion thereof. The tapered portions 107c and 107b of the drive pin 107 and the drive pin bore 107a, respectively, define the position of the drive pin 107 when it is at its most extended state. In the "set" condition of the apparatus of the second embodiment, a locking ball 108 is disposed partially in the drive pin bore 107a and partially in the trigger pin bore 109a. The locking ball 108 is pressed toward the drive pin bore 107a by the trigger pin 109 and is operable to maintain the drive pin 107 in its retracted state by engagement with the taper 107c of the drive pin 107.

In operation, upon the occurrence of a vibration or shock greater than a predetermined magnitude, the inertia ball 111 is caused to jump onto the lever 112 and roll therealong to the free end of the lever 112. When at the free end of the lever 112, the inertia ball 111 is magnetically attracted by the magnet 113 so as to cause the lever 112 to pivot downwardly about its pivot axis 112a, to thereby press the release pin 114 downwardly against the bias spring 117 into its second position (see FIG. 5). When the release pin 114 is moved to its second position, the trigger balls 110 are also moved downwardly, thus allowing the trigger pin 109 to be pressed into its fourth position by the locking ball (or second member moving means) 108, which is pressed toward the trigger pin 109 by the biasing force of the drive spring 119 against the drive pin 107. When the locking ball 108 is moved to the position shown in FIG. 5, the drive pin 107 is force downwardly by drive spring 119 into its extended position, wherein it is adapted to move the switch 120 into its closed position.

While the present invention has been described with reference to the foregoing embodiments, it will be understood by those skilled in the art that various changes and modifications may be made thereto which fall within the scope of the appended claims.

What is claimed is:

1. A safety apparatus for automatically moving an ON/OFF member of a device upon occurrence of vibration or shock, comprising:
   a trigger housing;
   a first member mounted in said trigger housing for rectilinear movement between a first position and a second position;
   a second member mounted at least partially in said trigger housing for rectilinear movement between a third position and a fourth position, said second member being in said third position when said first member is in said first position, and said second member being movable to said fourth position when said first member is moved to said second position;
   second member moving means for moving said second member from said third position to said fourth position when said first member is moved from said first position to said second position;
   ON/OFF member moving means, operatively connected to said second member, for moving the ON/OFF member of the device when said second member is moved from said third position to said fourth position;
   first member biasing means for biasing said first member toward said first position;
   first member moving means for automatically moving said first member from said first position to said second position against the bias of said biasing means, upon the occurrence of a vibration or shock of greater than a predetermined magnitude; and
   wherein said first member moving means comprises a lever pivotably mounted about an axis for movement between a fifth position in which said lever does not significantly press against said first member, and a sixth position in which said lever presses said first member into said second position, and means for moving said lever from said fifth position to said sixth position.

2. A safety apparatus as recited in claim 1, wherein said lever moving means comprises an inertia cup mounted in said trigger housing and having an indented upper surface, and an inertia ball disposed in said trigger housing and being adapted to rest on said indented upper surface of said inertia cup; and
   said lever is mounted with one end thereof adjacent said inertia cup such that, upon occurrence of the vibration or shock of greater than the predetermined magnitude, said inertia ball can move from said upper surface of said inertia cup and onto said lever.

3. A safety apparatus as recited in claim 2, wherein said lever moving means further comprises a magnet mounted beneath the other end of said lever; and said inertia ball is formed of a magnetically attractable material, such that when said inertia ball rolls to said other end of said lever, said magnet attracts said inertia ball and causes pivoting of said lever to said sixth position.

4. A safety apparatus as recited in claim 2, wherein said lever is trough shaped to allow said ball to roll therealong.

5. A safety apparatus as recited in claim 1, wherein said second member is mounted perpendicular to said first member.

6. A safety apparatus for automatically moving an ON/OFF member of a device upon occurrence of vibrations or shock, comprising:
 a trigger housing;
 a first member mounted in said trigger housing for rectilinear movement between a first position and a second position;
 a second member mounted at least partially in said trigger housing for rectilinear movement between a third position and a fourth position, said second member being in said third position when said first member is in said first position, and said second member being movable to said fourth position when said first member is moved to said second position;
 second member moving means for moving said second member from said third position to said fourth position when said first member is moved from said first position to said second position;
 ON/OFF member moving means, operatively connected to said second member, for moving the ON/OFF member of the device when said second member is moved from said third position to said fourth position;
 first member biasing means for biasing said first member toward said first position;
 first member moving means for automatically moving said first member from said first position to said second position against the bias of said biasing means, upon the occurrence of a vibration or shock of greater than a predetermined magnitude; and
 a plurality of ball members mounted in said trigger housing about said first member for guiding movement of said first member between said first and second positions.

7. A safety apparatus for automatically moving an ON/OFF member of a device upon occurrence of vibration or shock, comprising:
 a trigger housing;
 a first member mounted in said trigger housing for rectilinear movement between a first position and a second position;
 a second member mounted at least partially in said trigger housing for rectilinear movement between a third position and a fourth position, said second member being in said third position when said first member is in said first position, and said second member being movable to said fourth position when said first member is moved to said second position;
 second member moving means for moving said second member from said third position to said fourth position when said first member is moved from said first position to said second position;
 ON/OFF member moving means, operatively connected to said second member, for moving the ON/OFF member of the device when said second member is moved from said third position to said fourth position;
 first member biasing means for biasing said first member toward said first position;
 first member moving means for automatically moving said first member from said first position to said second position against the bias of said biasing means, upon the occurrence of a vibration or shock of greater than a predetermined magnitude; and
 wherein said ON/OFF member moving means comprises a drive member mounted in said trigger housing for rectilinear movement between a retracted position and an extended position, said drive member being in said retracted position when said second member is in said third position and said drive member being movable to said extended position when said second member is moved to said fourth position, and drive member moving means for moving said drive member from said retracted position to said extended position when said second member is moved from said third position to said fourth position.

8. A safety apparatus as recited in claim 7, wherein said drive member is mounted in a drive bore formed in said trigger housing; and
 said drive member moving means comprises a spring biasing said drive member toward said extended position.

9. A safety apparatus for automatically moving an ON/OFF member of a device upon occurrence of vibration or shock, comprising:
 a trigger housing;
 a first member mounted in said trigger housing for rectilinear movement between a first position and a second position;
 a second member mounted at least partially in said trigger housing for rectilinear movement between a third position and a fourth position, said second member being in said third position when said first member is in said first position, and said second member being movable to said fourth position when said first member is moved to said second position;
 second member moving means for moving said second member from said third position to said fourth position when said first member is moved from said first position to said second position;
 ON/OFF member moving means, operatively connected to said second member, for moving the ON/OFF member of the device when said second member is moved from said third position to said fourth position; and
 first member moving means for automatically moving said first member from said first position to said second position upon the occurrence of a vibration or shock of greater than a predetermined magnitude;
 said first member moving means comprising a lever pivotably mounted about an axis for movement between a fifth position in which said lever does not significantly press against said first member and a sixth position in which said lever presses said first member into said second position, and means for moving said lever from said fifth position to said sixth position;
 wherein said lever moving means comprises an inertia cup mounted in said trigger housing and having an indented upper surface, and an inertia ball disposed in said trigger housing and being adapted to rest on said indented upper surface of said inertia cup; and wherein said lever is mounted with one end thereof adjacent said inertia cup such that, upon occurrence of the vibration or shock of greater than the predetermined magnitude, said inertia ball can move from said upper surface of said inertia cup and onto said lever.

10. A safety apparatus as recited in claim 9, wherein said lever moving means further comprises a magnet mounted beneath the other end of said lever; and said inertia ball is formed of a magnetically attractable material, such that when said inertia ball rolls to said other end of said lever, said magnet attracts said inertia ball and causes pivoting of said lever to said sixth position.

11. A safety apparatus as recited in claim 9, wherein said lever is trough shaped to allow said ball to roll therealong.

12. A safety apparatus for automatically moving an ON/OFF member of a device upon occurrence of vibration or shock, comprising
a trigger housing;
a first member mounted in said trigger housing for rectilinear movement between a first position and a second position;
a second member mounted at least partially in said trigger housing for rectilinear movement between a third position and a fourth position, said second member being in said third position when said first member is in said first position, and said second member being movable to said fourth position when said first member is moved to said second position;
second member moving means for moving said second member from said third position to said fourth position when said first member is moved from said first position to said second position;
a third member mounted for rectilinear movement relative to said trigger housing, and in a direction perpendicular to a direction in which said second member moving means is operable to move said second member, between an extended position and a retracted position; and
third member biasing means for biasing said third member toward said extended position; and
first member biasing means for biasing said first member toward said first position; and
first member moving means for biasing said first member toward said first position; and
first member moving means for automatically moving said first member from said first position to said second position against the bias of said biasing means, upon the occurrence of a vibration or shock of greater than a predetermined magnitude.

13. A safety apparatus as recited in claim 12, further comprising
ON/OFF member moving means operatively coupled to the ON/OFF member of the device and to said second member, for moving the ON/OFF member in a particular direction when said second member is moved from said third position to said fourth position;
a locking housing rotatably mounted to said trigger housing; and
wherein said third member is mounted to said locking housing and defines a locking means for locking said ON/OFF member moving means such that it does not move the ON/OFF member.

14. A safety apparatus as recited in claim 13, wherein said ON/OFF member moving means comprises a drive member operatively coupled to the ON/OFF member of the device and a drive housing rotatably mounted to said locking housing.

15. A safety apparatus as recited in claim 12, wherein said first member moving means comprises:
a lever pivotably mounted about an axis for movement between a fifth position in which said lever does not significantly press against said first member, and a sixth position in which said lever presses said first member into said second position; and
means for moving said lever from said fifth position to said sixth position.

16. A safety apparatus as recited in claim 15, wherein said lever moving means comprises an inertia cup mounted in said trigger housing and having an indented upper surface, and an inertia ball disposed in said trigger housing and being adapted to rest on said indented upper surface of said inertia cup; and said lever is mounted with one end thereof adjacent said inertia cup such that, upon occurrence of the vibration or shock of greater than the predetermined magnitude, said inertia ball can move from said upper surface of said inertia cup and onto said lever.

17. A safety apparatus as recited in claim 16, wherein said lever moving means further comprises a magnet mounted beneath the other end of said lever; and said inertia ball is formed of a magnetically attractable material, such that when said inertia ball rolls to said other end of said lever, said magnet attracts said inertia ball and causes pivoting of said lever to said sixth position.

18. A safety apparatus as recited in claim 16, wherein said lever is trough shaped to allow said ball to roll therealong.

19. A safety apparatus as recited in claim 12, further comprising
a plurality of ball member mounted in said trigger housing about said first member for guiding movement of said first member between said first and second positions.

20. A safety apparatus as recited in claim 12, wherein said second member is mounted perpendicular to said first member.

21. A safety apparatus for automatically moving an ON/OFF member of a device upon occurrence of vibration or shock, comprising:
a trigger housing;
a first member mounted in said trigger housing for rectilinear movement between a first position and a second position;
a second member mounted at least partially in said trigger housing for rectilinear movement between a third position and a fourth position, said second member being in said third position when said first member is in said first position, and said second member being movable to said fourth position when said first member is moved to said second position;
a third member mounted for rectilinear movement relative to said trigger housing, and in a direction perpendicular to a direction in which said second member moving means is operable to move said second member, between an extended position and a retracted position; and third member biasing means for biasing said third member toward said extended position; and first member moving means for automatically moving said first member from said first position to said second position upon the occurrence of a vibration or shock of greater than a predetermined magnitude;

said first member moving means comprising a lever pivotably mounted about an axis for movement between a fifth position in which said lever does not significantly press against said first member and a sixth position in which said lever presses said first member into said second position, and means for moving said lever from said fifth position to said sixth position.

22. A safety apparatus as recited in claim 21, wherein said lever moving means comprises an inertia cup mounted in said trigger housing and having an indented upper surface, and an inertia ball disposed in said trigger housing and being adapted to rest on said indented upper surface of said inertia cup; and said lever is mounted with one end thereof adjacent said inertia cup such that, upon occurrence of the vibration or shock of greater than the predetermined magnitude, said inertia ball can move from said upper surface of said inertia cup and onto said lever.

23. A safety apparatus as recited in claim 22, wherein said lever moving means further comprises a magnet mounted beneath the other end of said lever; and said inertia ball is formed of a magnetically attractable material, such that when said inertia ball rolls to said other end of said lever, said magnet attracts said inertia ball and causes pivoting of said lever to said sixth position.

24. A safety apparatus as recited in claim 22, wherein said lever is trough shaped to allow said ball to roll therealong.

* * * * *